O. DAHLKE.
SHAFT PACKING.
APPLICATION FILED JUNE 20, 1912.

1,080,751.

Patented Dec. 9, 1913.
2 SHEETS—SHEET 1.

Witnesses:
Marcus L. Byng,
J. Ellis Glen

Inventor,
Oskar Dahlke,
by Albert G. Davis
Att'y.

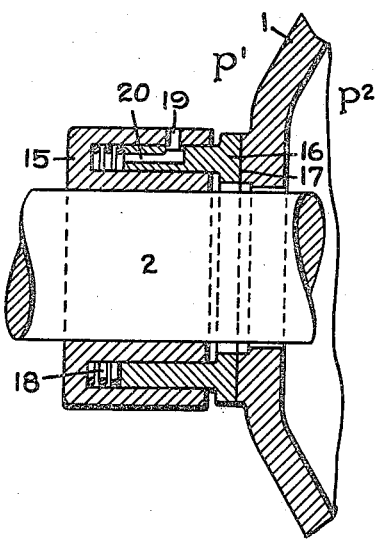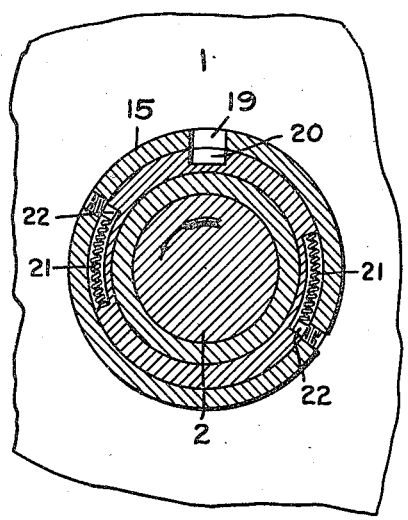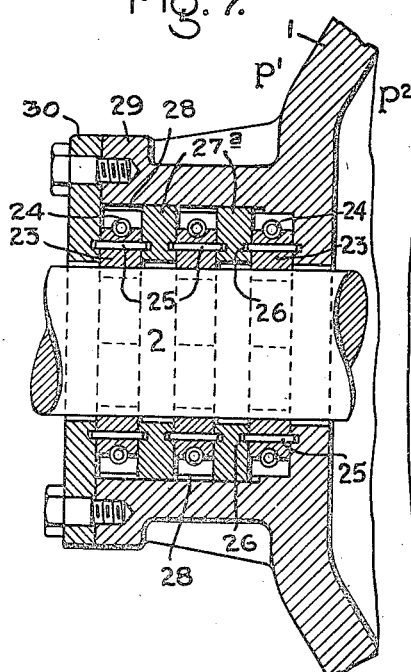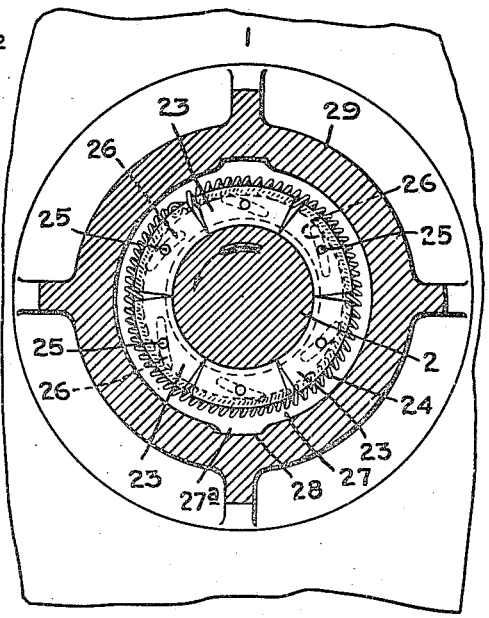

UNITED STATES PATENT OFFICE.

OSKAR DAHLKE, OF CHARLOTTENBURG, GERMANY, ASSIGNOR TO GENERAL ELECTRIC COMPANY, A CORPORATION OF NEW YORK.

SHAFT-PACKING.

1,080,751.  Specification of Letters Patent.  Patented Dec. 9, 1913.

Application filed June 20, 1912. Serial No. 704,836.

*To all whom it may concern:*

Be it known that I, OSKAR DAHLKE, a subject of the King of Prussia, residing at Charlottenburg, Germany, have invented certain new and useful Improvements in Shaft-Packing, of which the following is a specification.

This invention relates to devices for packing the joint between a rotating shaft and a stationary surface such as the wall of a casing through which it passes, for the purpose of preventing the escape of fluid pressure through said joint.

The invention is especially useful in connection with fluid pressure turbines and the like. It is quite customary in such machines to provide packing rings which can be adjusted to take up wear, or which are pressed continuously, by means of springs or fluid pressure, against the surfaces with which they make the joint. It is clear that such devices cause great friction, which impairs the efficiency of the machine and causes a rapid destruction of the rubbing surfaces. If it is attempted to avoid this by reducing the pressure between these surfaces, the tightness of the joint is liable to be impaired. It is found, however, that a satisfactory result will be accomplished if the surface pressure at the joint is reduced to and maintained at a light contact.

The present invention has for its object to maintain such light contact under varying degrees of fluid pressure tending to affect it.

To this end the invention consists in means whereby the force of pressure between the packing surfaces shall be automatically regulated by means of the moment of friction arising between the relatively rotating friction surfaces.

Figure 1:
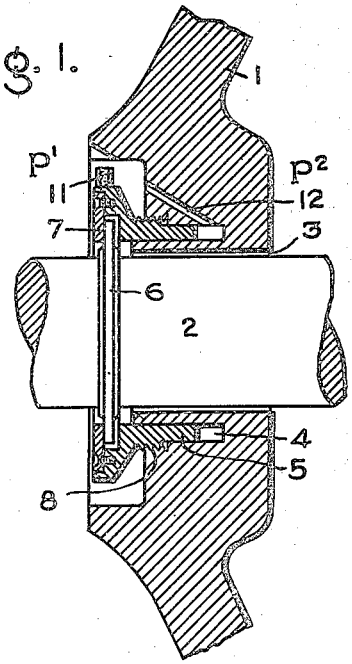
Figure 2:
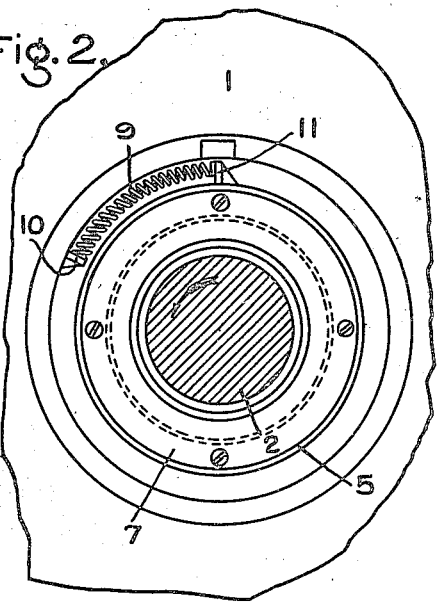
Figure 3:
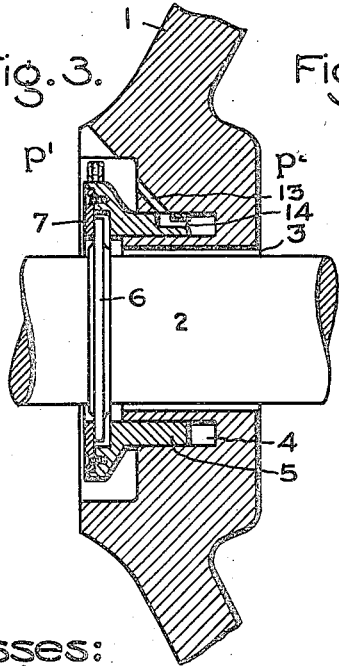
Figure 4:
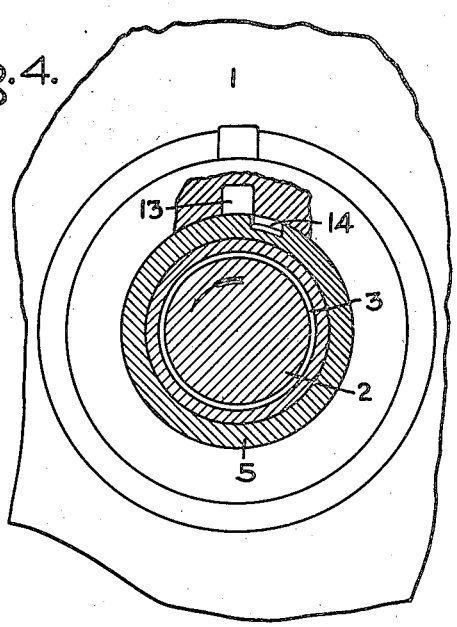

In the accompanying drawings, Figure 1 is a longitudinal section of a joint embodying one form of my invention; Fig. 2 is a front view of the same, the shaft being in section; Fig. 3 is a longitudinal section of a joint showing a modified form of the invention; Fig. 4 is a cross section of said modification; Figs. 5 and 6 are respectively longitudinal and cross sections of a joint embodying a further modification; and Figs. 7 and 8 are similar views of a fourth modification of the said invention.

In all these views the part marked 1 represents a portion of a diaphragm separating two chambers P' P², the former containing elastic fluid under greater pressure than that in the latter. A shaft 2 passes through an opening 3 in said diaphragm, and my invention relates to the packing which prevents the escape of the elastic fluid through said opening.

In Figs. 1, 2, 3 and 4 the casing is provided with a deep annular groove 4 concentric with the shaft and receiving a sleeve 5 cylindrical in shape and adapted to slide longitudinally in said groove. The outer end of the sleeve is rabbeted to receive the edge of a collar 6 secured on the shaft and rotating therewith. A flat annular plate or ring is fastened to the front face of the sleeve and lies in contact with the front face of the collar 6. This joint between the collar and the ring forms the packing for the shaft, and to insure a good joint the surfaces of said collar and ring are finished off in planes of revolution and fit together snugly.

A longitudinal movement of the sleeve 5 in its groove if in one direction will press these friction surfaces together more closely, while if in the other direction it will tend to separate them. Different modes of effecting this movement are shown. In Figs. 1 and 2 the sleeve is screw-threaded to engage with screw-threads 8 on the wall of the groove, so that a rotation of said sleeve will move it longitudinally in said groove. It is biased to turn in one direction by means of a spring 9 which abuts between a shoulder 10 on the casing and a lug 11 on the sleeve. This spring tends to screw the sleeve into the groove and increase the pressure between the friction surfaces of the collar and the ring. Whenever, by reason of an increase of force this frictional pressure becomes too great, the friction between said surfaces will become sufficient to enable the collar to exert a turning moment on the ring, and the sleeve will be turned in a direction to unscrew it slightly and put a greater compression on the spring. A reduction of the force pressing the surfaces together will permit the spring to urge the sleeve in the other direction to take up any tendency of the collar to separate from the ring. A duct 12 leads from the casing to the inner end of the groove to prevent the fluid therein from being compressed when the sleeve is screwed in, which might interfere with its free movement, and impair the accuracy of adjustment and the uniformity of the packing.

In Figs. 3 and 4 the screw-threads are omitted, and the sleeve is free to move in or out in its groove. Normally the pressure upon the ring will tend to force the sleeve inwardly, but if this pressure becomes too great the ring will turn and the friction will cause the ring to turn the sleeve and bring a port 13 in line with a duct 14 through which fluid pressure can have access to the inner end of the groove and urge the sleeve outwardly a trifle to counteract the excessive friction, and restore the packing pressure to normal. A spring similar to the spring 9 tends to turn the sleeve to keep the port out of communication with the duct.

In Figs. 5 and 6 the groove for the sleeve is formed in a heavy collar 15 secured upon the shaft, so that the sleeve rotates with said shaft. The projecting end 16 of the sleeve is preferably widened and faced off to coöperate with a faced-off surface 17 on the diaphragm in a plane of revolution concentric with the shaft. A spring 18 in the inner end of the groove forces the sleeve against said surface 17, being assisted by the elastic fluid pressure which is admitted to said groove through a duct 19 in the collar and a port 20 in the sleeve, said duct and port being normally in registration. When excessive friction occurs at the surfaces 16, 17 the sleeve is slightly rotated in the groove and the port is carried partly or wholly out of line with the duct, so that the fluid pressure assisting the spring 18 is throttled and the pressure is lessened. Springs 21 abutting between shoulders on the sleeve and pins 22 inserted through the collar 15 restore the sleeve to its normal position when the friction is lessened.

Figs. 7 and 8 show an arrangement of parts wherein the packing consists of a plurality of segments 23 grouped around the shaft and held in contact therewith by a garter spring 24. Each segment contains a transverse pin 25 whose ends are engaged by spiral grooves 26 in a stationary support, such as the rings 27 surrounding the shaft and prevented from rotating by one or more ribs 27ª engaging with grooves 28 in the counterbored portion 29 of the casing in which the packing is housed. A cap 30 confines the packing and rings and has grooves for the ends of the pins in the outer section of said packing; a number of segmental rings being preferred, as shown. When the friction between the shaft and the segments increases unduly, the pins ride up slightly in the grooves and the segments are lifted away from the shaft until the reduced friction is just sufficient to enable it to counterbalance the inward pressure of the garter springs.

In accordance with the provisions of the patent statutes, I have described the principle of operation of my invention, together with the apparatus which I now consider to represent the best embodiment thereof; but I desire to have it understood that the apparatus shown is only illustrative, and that the invention can be carried out by other means.

What I claim as new and desire to secure by Letters Patent of the United States, is,—

1. Means for regulating the pressure between fixed and rotating members of a joint packing between chambers containing elastic fluid of different pressures, which comprises means for enabling the moment of friction between said members to separate them automatically, and means biasing them toward each other.

2. The combination with chambers containing elastic fluid under different pressures, of a shaft passing through said chambers, a joint packing for said shaft comprising members in frictional contact, and means responsive to variations in friction between said members for maintaining a substantially uniform contact between them.

3. The combination with chambers containing elastic fluid under different pressures, of a shaft passing through said chambers, a joint packing for said shaft comprising a member rotatable with said shaft, a member in frictional contact therewith, means urging said members together, and means whereby an increase of friction will effect a separation of said members.

4. The combination with chambers containing elastic fluid under different pressures, of a shaft passing through said chambers, a sleeve concentric with said shaft and movable longitudinally thereof, a packing surface carried by said sleeve, another packing element coöperating therewith, means urging said sleeve toward said packing element, and means whereby an increase of friction between said elements effects a longitudinal movement of said sleeve in the opposite direction to lessen the frictional pressure.

5. The combination with a diaphragm separating two chambers containing elastic fluid of different pressures, of a shaft passing through said diaphragm, a groove in said diaphragm concentric with said shaft, a sleeve in said groove and movable longitudinally of said shaft, a collar on said shaft, a ring on said sleeve making frictional contact with said collar, and means whereby an increase of frictional pressure produces a separation of said ring and collar.

6. The combination with a diaphragm separating two chambers containing elastic fluid of different pressures, of a shaft passing through said diaphragm, a sleeve concentric with said shaft and adapted to establish a frictional packing joint with a relatively revolving surface, a spring exerting an angular bias on said sleeve in a direction opposite to that induced by the friction, and means for moving said sleeve longitudinally to lessen the friction when the pressure between the packing surfaces exceeds a predetermined amount.

7. The combination with a diaphragm separating two chambers containing elastic fluid of different pressures, of a shaft passing through said diaphragm, a groove in said diaphragm concentric with said shaft, a sleeve in said groove movable longitudinally of said shaft, a collar on said shaft, a ring on said sleeve making frictional contact with said collar, coöperating screw threads on said sleeve and the wall of said groove, and a spring biasing said sleeve in a direction to screw it into said groove.

In witness whereof, I have hereunto set my hand.

OSKAR DAHLKE.

Witnesses:
  CARL E. HILER,
  LOU ROLLES.